(12) United States Patent
McKillip

(10) Patent No.: US 6,304,194 B1
(45) Date of Patent: Oct. 16, 2001

(54) AIRCRAFT ICING DETECTION SYSTEM

(75) Inventor: Robert M. McKillip, Hopewell, NJ (US)

(73) Assignee: Continuum Dynamics, Inc., Ewing, NJ (US)

( * ) Notice: Subject to any disclaimer, the term of this patent is extended or adjusted under 35 U.S.C. 154(b) by 0 days.

(21) Appl. No.: 09/458,925

(22) Filed: Dec. 10, 1999

Related U.S. Application Data
(60) Provisional application No. 60/111,860, filed on Dec. 11, 1998.

(51) Int. Cl.[7] ................................................... G08B 21/00
(52) U.S. Cl. ........................ 340/962; 340/945; 340/580; 340/963; 701/14
(58) Field of Search ..................... 340/945, 962, 340/966, 580, 963; 201/10, 14, 15, 16, 124; 702/125; 73/147, 170.26; 244/134

(56) References Cited

U.S. PATENT DOCUMENTS

| | | | |
|---|---|---|---|
| 4,110,605 | * | 8/1978 | Miller .................................... 701/124 |
| 4,490,802 | * | 12/1984 | Miller .................................... 702/175 |
| 4,837,695 | * | 6/1989 | Baldwin ................................. 701/15 |
| 4,980,833 | * | 12/1990 | Milligan et al. ....................... 701/15 |
| 5,047,942 | * | 9/1991 | Middleton et al. .................... 701/15 |
| 5,341,677 | * | 8/1994 | Maris ..................................... 73/147 |

OTHER PUBLICATIONS

Applicant's admitted prior art on pp. 1–2 of the specification.*
Willsky, A.S., "A Survey of Design Methods for Failure Detection in Dynamic Systems," Automatica, vol. 12, pp. 601–611, 1976.
Andry, A., Jr., Shapiro, E., and Chung, J., "Eigenstructure Assignment for Linear Systems," IEEE Trans. On. Aerospace and Electronic Systems, vol. AES–19, No. 5, Sep. 1983.
Macmillan, R., "Advanced Icing Severity Level Indicating System (AISLIS)," USAAVSCOM TR–86–D–7, Dec. 1986.
Augustin, M. and Middleton, G., "A Review of the V–22 Health Monitoring System," Proc. 45th AHS Annual Forum, Boston, Mass., May 1989.
Patton, R.; Chen, Jr., "Robust Fault Detection of Jet Eng. Sensor Sys. Using Eigenstructure Assign." Journal of Guidance, Control, and Dynamics, vol. 15, No. 6, Nov.–Dec. 1992.

* cited by examiner

Primary Examiner—Benjamin C. Lee
(74) Attorney, Agent, or Firm—David M. Quinlan, P.

(57) ABSTRACT

The present invention comprises a system and method for detecting icing conditions in a multi-mode aircraft by indirectly detecting ice accretion through the measurement of aircraft performance related characteristics. Indirect characteristics are used, sometimes in additional to traditional icing sensor input, because it is difficult to safely and effectively position icing sensors in aircraft that may fly in the hover mode or the fixed wing mode as well as modes in between. Typical indirect characteristics might include thrust and rotor response for a given torque. This information is compared to a model of the expected aircraft performance to determine if icing is likely to take place. For example, decreased thrust or lift for a given torque may indicate the onset of icing. Inputs from the traditional icing sensors may also be employed as additional useful, predictive data. A recursive filter having a variable gain feedback control produces an output predictive of icing conditions and provides warning information to a cockpit display as well as control signals the anti-icing equipment.

12 Claims, 3 Drawing Sheets

AIRCRAFT ICING DETECTION SYSTEM

CROSS REFERENCE TO RELATED APPLICATIONS

This applications refers to and claims the priority of U.S. Provisional Patent Application Ser. No. 60/111,860 filed Dec. 11, 1998 and entitled "AIRCRAFT ICING DETECTION SYSTEM" the entire contents of which are incorporated herein by reference.

STATEMENT OF GOVERNMENT RIGHTS

This invention was made with Government support under a Small Business Innovative Research (SBIR) contract number N68335-96-0228 awarded by the U.S. Navy. The Government has certain rights in the invention.

BACKGROUND OF THE INVENTION

1. Field of Invention

The present invention relates to a method of detecting icing and icing growth rates on an aircraft through measurements of the aircraft's flight performance.

2. Description of Related Art

A major difficulty with multi-mode aircraft is that icing sensors are difficult to effectively and safely position. For example, the Bell/Agusta 609 and the Osprey V-22 aircraft will operate in both a hover mode, like a conventional helicopter, and in a fixed wing mode, like most normal aircraft. Unfortunately, this characteristic can make it difficult to know where to position icing sensors since the instruments will be subjected to totally different dynamic conditions depending upon whether the aircraft is hovering, flying fixed wing, or in some mode in between, as might occur during take off. In order to cope with this dilemma an effort was made to determine if useful information could be obtained from the general performance of the aircraft under icing conditions to determine, or at least supplement, traditional icing sensor output to anticipate icing conditions and take appropriate corrective action before serious control and lift problems occur.

Some aspects of the present invention are known in the prior art. Previous investigations by Leigh Instruments for the U.S. Army were directed towards a system for inferring the rate of ice accretion on a UH-1 rotor, through measurements of torque increases during periods of flight in known icing conditions. (See Macmillan, R., "Advanced Icing Severity Level Indicating System (AISLIS)," USAAVSCOM TR-86-D-7, December 1986.) This system was only partially successful, due to its reliance on significant pilot input for aiding the calculations performed by the device's internal UH-1 performance model (such as providing cargo weight and aircraft drag data), and for its use of relatively simplistic logic in gauging the type of icing present when torque increases were present in flight.

Related system monitoring devices are already part of, for example, the V-22 military aircraft. A similar combination of direct and indirect measurements are currently used in the V-22 Osprey's Central Integrated Checkout (CIC) and Vibration, Structural Life and Engine Diagnostic (VSLED) systems for maintenance and usage monitoring. (See Augustin, M. and Middleton, G., "A Review of the V-22 Health Monitoring System," Proc. 45th AHS Annual Forum, Boston, Mass., May 1989). This latter system acts as a terminal on the V-22's 1553 databus and uses aircraft parameters in conjunction with dedicated accelerometers to determine both aircraft flight load spectra and provide data for track and balance maintenance. A key advantage of the system is the elimination of the requirement for a large collection of dedicated and specialized instrumentation to perform this function. Monitoring logic for these systems primarily uses Boolean comparisons between measurements and reference points to determine system faults, plus capability for storage of time histories of out-of-condition data for subsequent post-flight analysis and maintenance activities.

Current state-of-the-art in aircraft icing detection typically incorporates discrete sensors located in strategic positions about the aircraft fuselage or wing structure in order to directly sense the amount of icing growth present at the sensor location. These sensor data may then be used to infer the ice growth at other locations on the aircraft if sufficient test data are available for extrapolation purposes. Such approaches are limited by the availability of aircraft structure to accommodate the given sensor, requirements to transfer power and data signals to each of these possibly remote sensors, and the need to have suitable data for proper interpretation of their associated output measurements.

SUMMARY OF THE INVENTION

The disclosed invention provides a means for indirectly detecting ice accretion through measurement of aircraft performance-related quantities. Since accreted ice can impact both aircraft performance and flight safety, sensing of total aircraft performance degradation on-line would also provide a means of assessing the relative severity of the particular icing event during an actual encounter. A fundamental advantage of this type of approach is that additional devices for measurement of ice accretion may be unnecessary due to the information provided by the available on-board instrumentation. A convenient conceptual model for this methodology is to consider the entire aircraft as the icing probe, such that knowledge of how the aircraft performance degrades in different icing encounters throughout its flight envelope allows the proposed system to sort out the location, type, and quantity of ice being accreted.

The proposed approach for icing detection comprises a methodology used to identify and isolate the location of significant ice accretion on the reference aircraft. Knowledge of how the aircraft performance deteriorates in icing is used to assess the severity and location of the icing event. That knowledge is employed through the use of a dynamic system reference model that can be made to "track" the current flight condition or mode. Incorporation of a model-based estimate of performance thus allows one to borrow from the rich collection of methodologies developed for fault detection in feedback control systems. The approach, described in the detailed disclosure that follow, blends an analytical performance prediction structure with a detection methodology that was originally based upon filtering techniques used to identify inoperative sensors or failed actuators in feedback control systems. This filtering technique, called fault detection filter (FDF) design, has been applied to a variety of aerospace systems and provides a common conceptual framework for incorporating ice detection methods using both direct and indirect sensor suites. (See, Willsky, A. S., "A Survey of Design Methods for Failure Detection in Dynamic Systems," Automatica, Vol. 12, pp. 601–611, 1976; and also see Patton, R. and Chen, J., "Robust Fault Detection of Jet Engine Sensor System Using Eigenstructure Assignment," Journal of Guidance, Control, and Dynamics, Vol. 15, No. 6, November–December 1992).

The methodology preferably combines the inputs from traditional discrete icing sensors (if present) with indirect information such as thrust and rotor characteristics in response to torque, and compares that information to an expected model of aircraft performance in a recursive filter. The filter output is fed to threshold checking logic to then generate an output that provides icing information to a cockpit visual display and possibly control signals to the aircraft's anti-icing equipment.

These and other features of the invention will be more fully understood by reference to the following drawings.

DETAILED DESCRIPTION OF THE PREFERRED EMBODIMENTS

Figure 1:
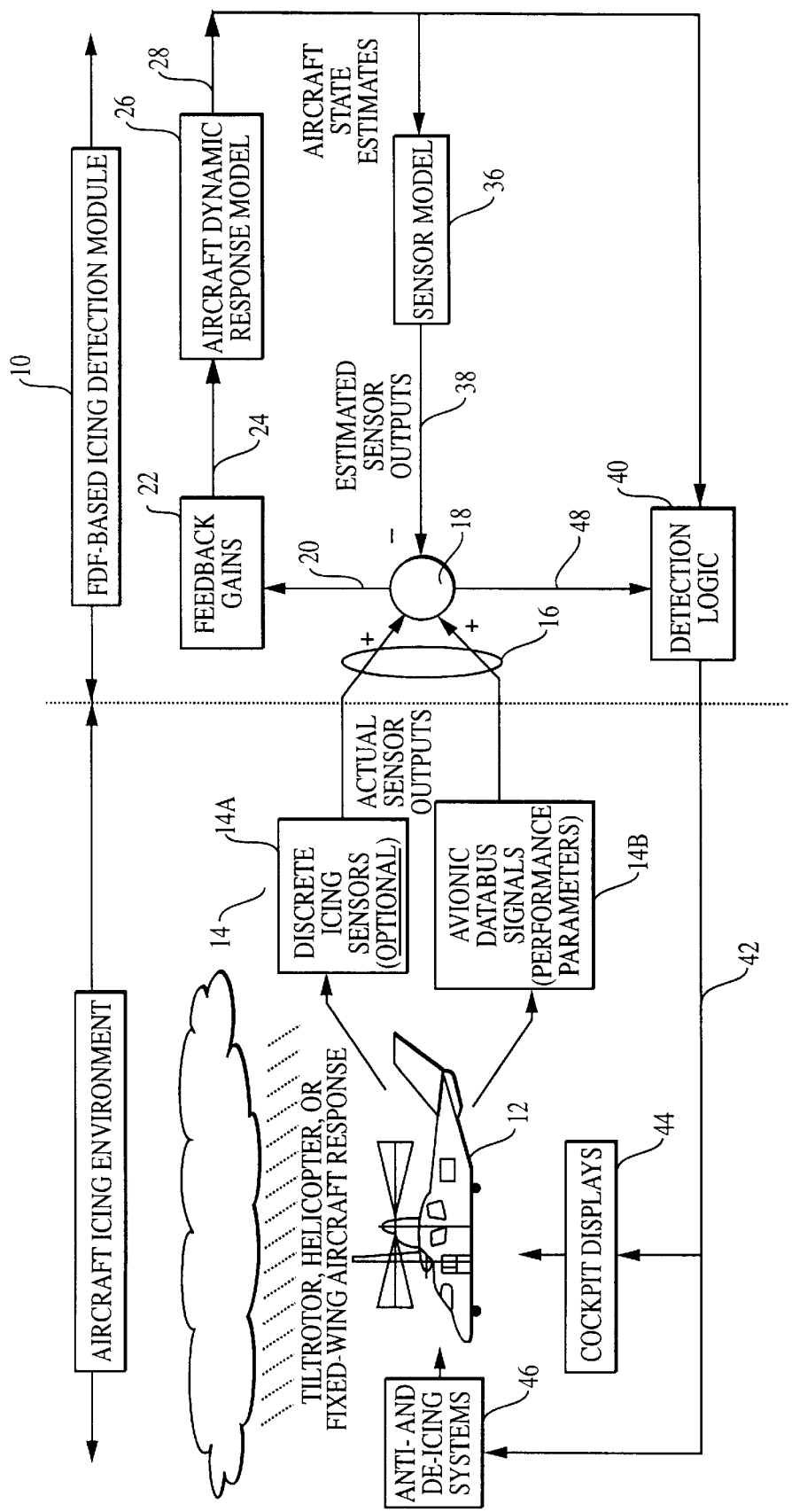
FIG. 1 is a schematic diagram of the icing detection system according to the preferred embodiment of the invention.

During the course of this description like numbers will be used to identify like elements according to the different figures that illustrate the invention.

In general, the invention 10 disclosed here comprises an on-board aircraft computer that has access to measurements of aircraft system parameters and can initiate pilot warnings or take appropriate automatic action upon detection of aircraft icing conditions; the embedded software for processing the measurement data to determine that performance measurements are indicative of an icing environment; and the detection algorithms that differentiate between other performance anomalies and those due to icing growth on the airframe and lifting surfaces. The preferred embodiment uses Fault Detection Filters (FDFs) to separate given performance changes from features other than icing growth, and may incorporate sensor data from an on-board aircraft databus as appropriate.

The design and formulation of the fault detection filter (FDF) algorithm is an extension of that described in Patton and Chen (1992). The main feature of the method consists of constructing a state estimator for the dynamic system that selects a feedback gain on the measurement residual to make the overall estimator sensitive to pre-specified types of system failures. Through careful selection of the gain matrix, one may force the measurement residual to remain fixed in a particular direction or a specific plane for a given failure mode. A simple example for a linear time-invariant system from Willsky (1976) serves to illustrate the approach. For a system described in state variable format, with x(t) representing a nx1 vector of state variables, u(t) an mx1 vector of control inputs to the system, and A and B representing the perturbations in the state time derivatives (marked by the dot superscript) to state and control changes, one has:

$$\dot{x}(t)=Ax(t)+Bu(t)$$

with an rx1 vector of measurements y(t) linearly related to the state variable through a matrix C according to:

$$y(t)=Cx(t)$$

a detection filter is designed of the form:

$$\dot{\hat{x}}(t)=A\hat{x}(t)+Dr(t)+Bu(t)$$

$$r(t)=y(t)-C\hat{x}(t)$$

where the "hatted" quantities represent the current estimates of the state variables, r(t) the measurement residual, and with D chosen to accentuate any failures that may occur in the system. For example, if a bias of magnitude v suddenly appears on the i-th actuator, the system becomes:

$$\dot{x}(t)=Ax(t)+B[u(t)+ve_i], \text{ or}$$

$$\dot{x}(t)=Ax(t)+Bu(t)+vb_i$$

where $b_i$ represents the i-th column of matrix B. For the case of full state measurement, C=I (the identity matrix), and thus the equation governing the measurement residual becomes:

$$\dot{r}(t)=[A-D]r(t)+vb_i$$

so if D is chosen=$[\sigma I+A]$, then the residual dynamics become:

$$\dot{r}(t)=-\sigma r(t)+vb_i, \text{ or,}$$

$$r(t)=\exp\{-\sigma(t-t_0)\}r(t_0)+v[1-\exp\{-\sigma t\}]b_i/\sigma$$

Thus, after the initial transient dies out, the steady residual maintains a fixed direction aligned with vector $b_i$. Note that its magnitude decreases as the bandwidth of the detection filter increases, thus trading off speed of response with sensitivity to noise in the system.

As applied to icing detection for aircraft, the known icing effects (obtained from test data or engineering predictions) are incorporated as "external" inputs to the system through, as in the above example, the B matrix; performance related measurements are expressed as components in the y vector. Detection logic may then be based upon magnitude checks of the resulting filter residuals, with the direction indicative of the type of icing effect encountered.

Detection filters are a form of recursive filter that couples a dynamic model of a particular process with an analytical model of the sensors used to measure features associated with that process. Differences between the sensor model predictions and the actual sensor outputs, called measurement residuals, are fed back as a weighted sum that is structured to be particularly sensitive to detecting certain pre-postulated system faults. These faults may be in the sensors, such as offsets, scale factor errors, or drifts in output, or in the system itself, such as parametric changes that influence the dynamics of the process being modeled. This formulation allows one to discriminate between a variety of potential variations in the system or sensors, thus providing a means for a complex system to accommodate potential failures and thereby avoid loss of functionality. While the technology associated with detection filter design has tended to be directed toward the monitoring of closed-loop control systems, detection filters offer potential advantages as a paradigm for incorporating a large and varied assortment of sensors for the detection of icing on a complex aircraft, such as the Bell/Agusta 609 tiltrotor and V-22 Osprey. A schematic of the filter structure (elements 18, 22, 26 and 36) may be seen in FIG. 1, showing the feedback correction to the state estimates from the measurement residuals.

Discrimination of various system changes is performed by structuring the filter feedback coefficients to force the filter dynamics to have discrete, identifiable modes of response when a particular parametric variation or sensor "malfunction" occurs. The modes of response may in turn produce output signals whose magnitude indicate the likelihood of a particular event, which would then initiate some action to accommodate the change of behavior and bring the system back to its nominal performance level. Thus, use of detection filters for determining the onset and extent of icing for a complex V/STOL aircraft would only require a reformulation of the dynamics of the "icing process" and its effects on aircraft performance in order to make use of this powerful methodology.

An alternate embodiment for more complicated configurations becomes necessary, if direct icing effects may not be modeled as above (i.e., as a "column" of a B matrix in the above equations), or if full state measurement is not possible. This approach would first involve the computer simulation (or flight testing) of the aircraft flying in an icing environment, with recording of the perturbations in the simulated (or actual) aircraft operational parameters (such as airspeed, altitude, throttle settings, etc.) that occur due to the icing encounter, onto a datafile for post-processing. These recorded data would be used to compute the primary variations of the system states that take place during an icing encounter, and then these dominant variations would be selected to represent "icing modes" of response of the aircraft. Each of possibly several "icing modes" is then isolated and identified as a discrete eigenvector of response of the aircraft. An eigenvalue/eigenvector assignment procedure is then used to determine the feedback gains (matrix D) in the above equations that make the observer sensitive to icing perturbations on the actual aircraft, as outlined below, and presented in the controls literature (See Andry, A., Jr., Shapiro, E., and Chung, J., "Eigenstructure Assignment for Linear Systems," IEEE Trans. On Aerospace and Electronic Systems, Vol. AES-19, No. 5, September 1983).

Andry, et. al., present an algorithm for computing feedback gains for a control system to provide a desired eigenstructure using output feedback. That is, in the above expressions, a control input u is desired that feeds back the outputs y using a matrix, here called F, such that the closed loop control system is governed by:

$$\dot{x}=Ax+B(Fy)=Ax+BFCx=(A+BFC)x$$

Note that the explicit time dependence of x, u and y has been dropped from the above equation, and will be assumed implicitly in what follows. For the fault detection problem of interest here, however, we wish to construct an observer for this system, and thus the B matrix in the above control equation would represent a unit matrix. The gain selection problem becomes one of finding the matrix F such that (A+FC) has the desired eigenstructure. One possible difficulty of this direct application of Andry's eigenstructure assignment approach to observer design, however, is that the number of "free" eigenvalue/eigenvector pairs available for specification is limited to the number of measurements in the system model, even though the elements within these limited number of eigenvectors may be matched exactly. While the number of measurements may be considerable for the type of system considered here, namely, an aircraft with an onboard databus that contains many parameters, this limitation may in fact be too burdensome for simpler implementations of data systems or on-board instrumentation on older aircraft. Another key limitation of this design flexibility is the lack of guaranteed stability of the resulting observer, since (n-r) eigenvalues are not available for placement with this approach. Instead, if one considers the "dual" problem of finding the F matrix for a given eigensystem associated with $(A^T+F^TC^T)$, as suggested by Patton, et. al. (1992), one may attempt to assign a complete set of n eigenvalue/eigenvector pairs. This capability comes with the caveat that the eigenvectors themselves will be restricted to a projection of a "best fit" to the original desired vectors, since the number of "free" coefficients within each eigenvector is limited, again, to the number of measurement of the system. For modeling icing events as "faults" of the system response, as revealed here, either of these two approaches ("direct" or "dual") may be used, depending upon the number of measurements available to the observer.

The "dual" algorithm for selecting the observer gain matrix F follows, since this provides the designer with the widest range of potential aircraft applications, although it will be appreciated by one skilled in the art that a "direct" algorithm application would possibly suffice for a system having a large number of measurements. Given a desired eigenvector ($v_i$), which one wishes the observer structure to contain, one then picks a suitable associated eigenvalue ($\lambda_i$) that is approximately three times faster (larger) than the dominant eigenvalue of the response mode associated with the icing encounter. For most aircraft, this would be a classical "phugoid" response mode, where the aircraft is primarily influenced by energy tradeoffs between altitude (influenced by flight path angle) and airspeed. These eigenvalue/eigenvector combinations are selected in order to span the full n-dimensional state vector, based upon observations of simulated or actual flight data from an icing encounter. Two types of eigenvectors are selected—those that represent the aircraft response to an icing event, or a particular icing mode (such as proprotor icing, wing icing, or tailplane icing), and other eigenvectors that are orthogonal to these icing mode eigenvectors. This selection aids the discrimination process in determining if an icing event has taken place on the aircraft, by shifting the relative "direction" of the state perturbations to align themselves almost exclusively with these icing mode eigenvectors.

Collecting these eigenvectors in a matrix as:

$$M=[v_1 v_2 \ldots v_n]$$

one finds its inverse, which are desired to represent the "left eigenvectors" of the "dual" observer system:

$$A^T-C^TF^T$$

Let this inverse matrix be given as:

$$M^{-1}=[\mu_1 \mu_2 \ldots \mu_n]$$

and let each of the $\mu_i$ be rearranged by rows where the first r rows (where r is the number of measurements available) represent the dominant, desired values of $\mu_i$ to be matched in the observer eigenstructure, and the remaining (n-r) rows "arbitrary", or matched in a least-squared sense:

$$\mu_i \begin{bmatrix} l_i \\ d_i \end{bmatrix}, dim(l_i) = r, dim(d_i) = n - r$$

For each associated eigenvalue $\lambda_i$ (note that the eigenvalues are the same for the "direct" and "dual" or transformed system), one computes the nxr matrix:

$$(\lambda_i I - A^T)^{-1}C^T = L_i$$

and, additionally, a row-reordered version, according to that used on the $\mu_i$ values:

$$\begin{bmatrix} \tilde{L}_i \\ D_i \end{bmatrix} = \text{reordered } L_i$$

The "achievable" eigenvectors for this "dual" problem are given by:

$$\mu_i^A = L_i(\tilde{L}_i^T \tilde{L}_i)$$

which represents a least-squares projection of the desired left eigenvectors onto a vector space spanned by the available output space of the mapping imposed by the quantity $(\lambda_i I - A^T)^{-1} C^T$. This process of computing all "achievable" eigenvectors is repeated for the remaining (n−1) cases. Once these have been determined, the observer gain required to realize this eigensystem is computed according to the following steps. First, add columns to the $C^T$ matrix to generate an nxn transformation matrix of full rank:

$$T = \lfloor C^T I \mid P \rfloor, \text{rank}(T) = n$$

Use this T matrix to transform the "dual" system according to:

$$\tilde{A} = T^{-1} A^T T$$

$$\tilde{C} = T^{-1} C^T$$

$$\tilde{\mu}_i = T^{-1} \mu_i$$

Now partitioning the $\tilde{A}$ matrix and transformed eigenvector $\tilde{i}_i$ as:

$$\tilde{A} = \begin{bmatrix} A_{11} & A_{12} \\ A_{21} & A_{22} \end{bmatrix}, \tilde{\mu}_i = \begin{bmatrix} z_i \\ w_i \end{bmatrix}, \text{ and } A_1 = [A_{11} \quad A_{12}]$$

where $A_{11}$ is rxr, $A_{12}$ is rx(n−r), and $z_i$ is rx1, we define matrices:

$$V = [\mu_1 \mu_2 \ldots \mu_n]$$

$$Z = [\lambda_1 z_1 \lambda_2 z_2 \ldots \lambda_n z_n]$$

where V is nxn and Z is rxn. The observer gains are then:

$$F^T = (Z - A_1 V)(TV)^{-1}$$

The preferred embodiment of the invention 10 as a system is illustrated in FIG. 1. A rotor driven, multi-mode aircraft 12 such as the civilian Bell 609 or the military version V-22 Osprey would be typical of such aircraft. The unique characteristic of such aircraft is that they can fly in either the hover mode, like a helicopter, or in the fixed wing mode, like a typical airplane, or sometimes in between, as when taking off or in a transition mode. Because of this, it is difficult to place traditional icing sensors in a location where the changing dynamics of the plane's flight doesn't adversely affect the reliability of the icing instruments' output. Traditional icing sensors often comprise vibrating rods whose natural frequency changes in the presence of icing conditions or capacitance sensors that can detect the difference between water and ice. The aircraft 12 includes a plurality of sensors 14 that fall into two groups. The first group are traditional icing sensors 14a that detect icing generally through changes in natural vibrational frequency or through changes in capacitance as previously described. The second set of sensors 14b detect aircraft performance characteristics such as torque, resulting thrust and rotor blade characteristics. The output 16 from sensor groups 14a and 14b is fed along a conventional databus, such as the military 1553 databus, to a comparator 18. The comparator 18 also receives as a negative feedback, the output 38 of a sensor model 36 which includes the expected aircraft performance data. Comparator 18 has an output 20 that acts as an input to the feedback gain control 22. Output 20 can change the values of the feedback gains 22 depending upon the mode of flight, e.g. hover vs. fixed wing, and other parameters. The output 24 of feedback gain control 22 provides an input to the aircraft dynamic response model 26. The aircraft response model 26 has an output 28 that forms the input to the sensor model 36 and the detector logic 40. Together elements 18, 22, 26 and 36 operate in the manner of a recursive filter as discussed in detail previously. Detection logic 40 accepts as one input the output 28 from the dynamic model 26 and as a second input the output 48 of comparator 18. Based upon this information detector logic 40 produces an output 42 which comprises inputs to a cockpit display 44 and a control signal to the onboard aircraft anti-icing and deicing equipment 46.

Figure 2A:
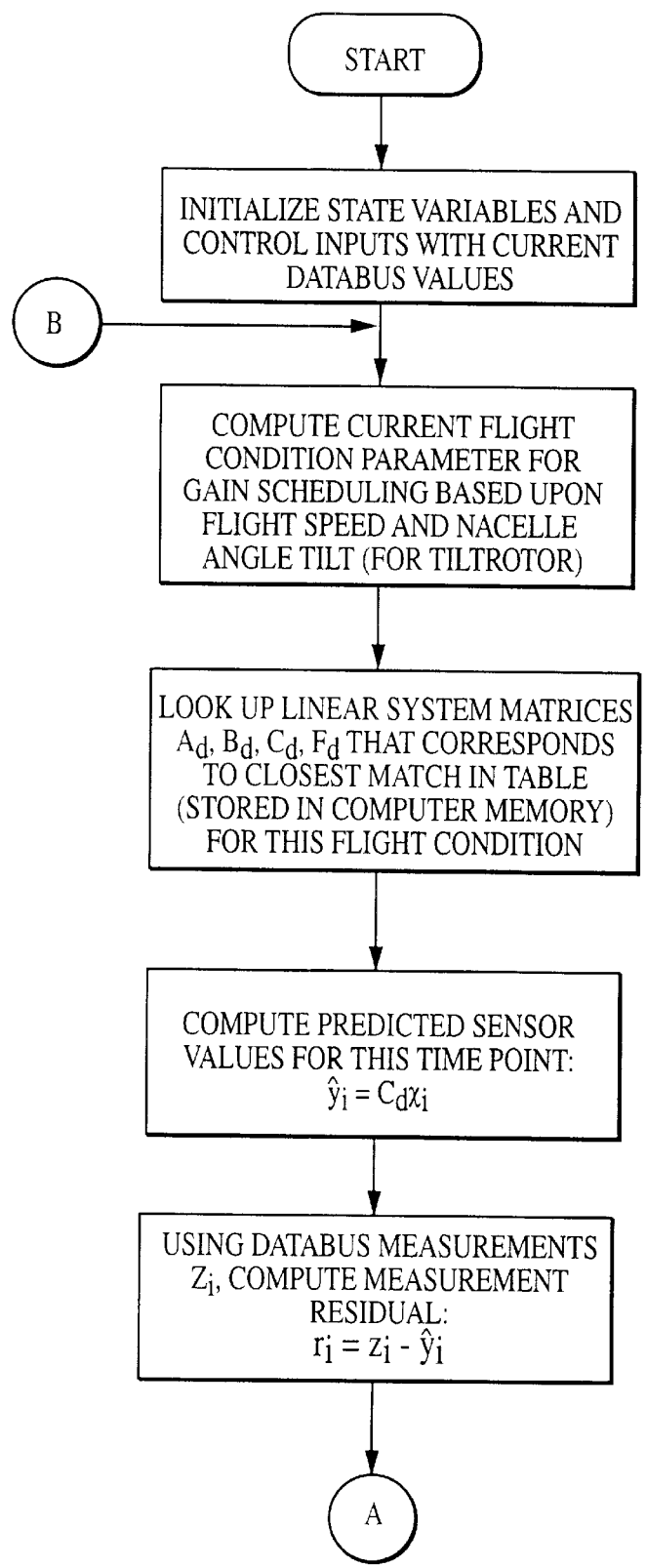
FIGS. 2a and 2b are a flow diagram representing the steps of the method of the invention shown in FIG. 1 above.
Figure 2B:
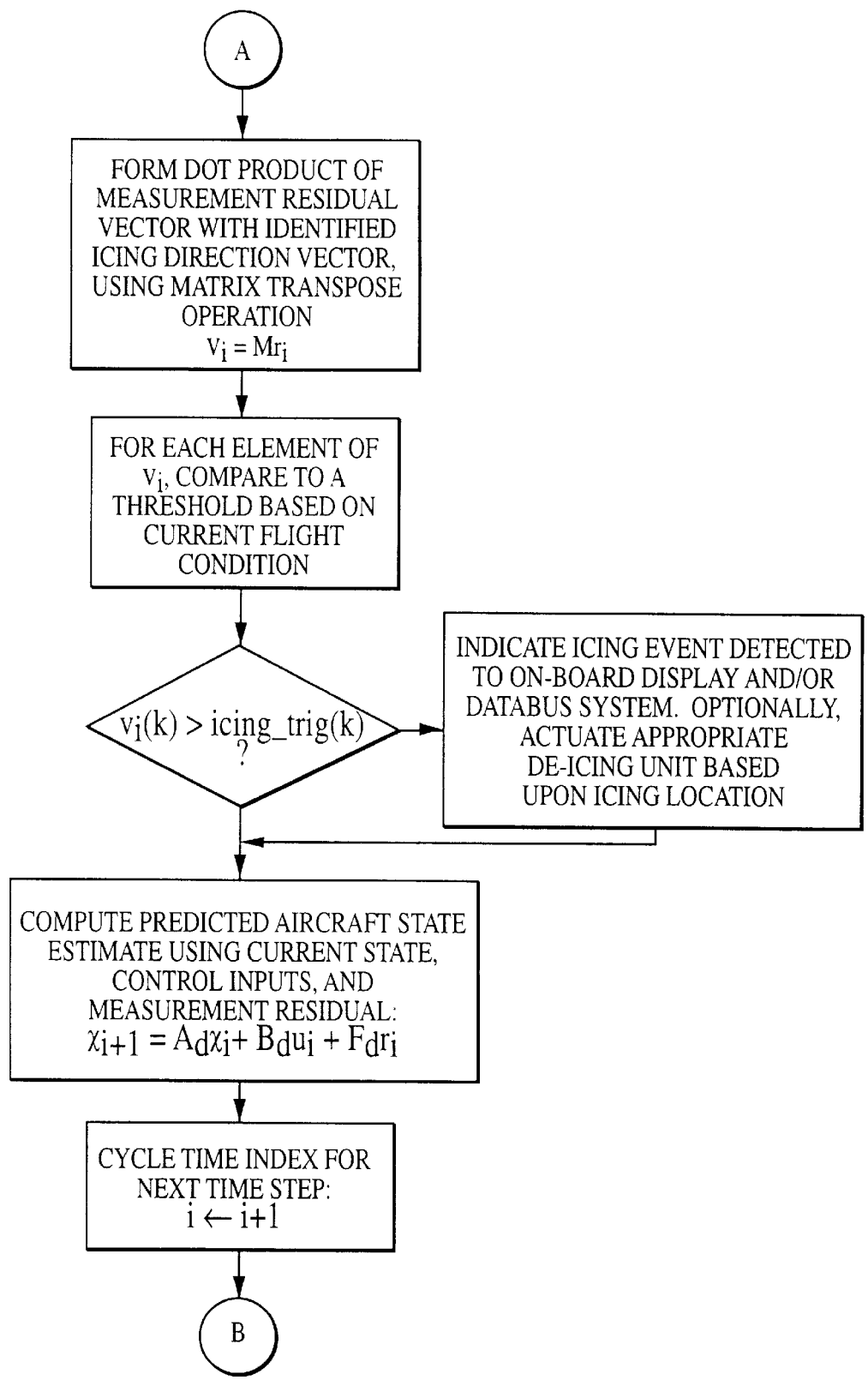

Implementation of the icing detection algorithm, using the fault detection methodology, is illustrated in FIGS. 2a and 2b. In this diagram, a gain-scheduled linear model and residual feedback matrix are indexed by flight condition in order to cover the multi-modal flight behavior and icing accretion ranges, of the host aircraft.

While the invention has been described with respect to a preferred embodiment thereof, nevertheless, it will be appreciated by those of ordinary skill in the art that various modifications can be made to the invention without departing from the spirit and scope thereof.

What is claimed is:

1. A method for detecting icing on a rotor driven aircraft capable of at least two modes of flight, one of said modes comprising a hover mode and another of said modes comprising a fixed wing mode, said aircraft including icing sensors for directly detecting the presence of ice on said aircraft and aircraft performance sensors, said method comprising the steps of:
   a. detecting an output from said aircraft performance sensors;
   b. comparing said aircraft performance sensor output to a model of said aircraft performance;
   c. creating an error signal as a result of said comparison and using said error signal to detect icing conditions;
   d. detecting an output of said icing sensors;
   e. comparing said icing sensor output to a model of expected outputs; and
   f. modifying the error signal created in step c in response to said comparison in step e.

2. The method of claim 1 wherein said detecting step a. includes detection of torque and thrust on said rotor from said aircraft performance sensors.

3. A system for detecting icing conditions in an aircraft capable of operating in at least two discrete modes, said system comprising:
   aircraft performance sensors for detecting the performance of the aircraft and creating at least one aircraft performance detector output;
   comparison means for comparing said aircraft performance detector output with an input representative of estimated sensor outputs;
   feedback means for affecting the value of said estimated sensor outputs, wherein said feedback means comprises (i) feedback gain means connected to an output of said comparison means, (ii) dynamic model means having an input and an output, said input being connected to an output of said feedback gain means, and (iii) sensor model means having an input and an output, said input of said sensor model means being connected to said output of said dynamic model means and said output of said sensor model means comprising said input to said comparison means; and detection logic means connected to an output of said comparison means for producing an output for an output means.

4. The system of claim 3 wherein said aircraft operates in at least a hover mode and a fixed wing mode and wherein said feedback gain means is controlled by said comparison means to adjust for the mode of flight that the aircraft is flying in.

5. The system of claim 4 further including:

icing detector means for independently detecting icing conditions and feeding that information to said comparison means.

6. The system of claim 5 wherein said output means comprises:

aircraft anti-icing means.

7. The system of claim 5 wherein said output means comprises:

cockpit display means for displaying the presence or absence of icing conditions.

8. A system for detecting icing conditions in an aircraft, said system comprising:

aircraft performance sensors for detecting the performance of the aircraft and creating at least one aircraft performance detector output;

comparison means for comparing said aircraft performance detector output with an input representative of estimated sensor outputs;

feedback means for affecting the value of said estimated sensor outputs, wherein said feedback means comprises (i) feedback gain means connected to an output of said comparison means, (ii) dynamic model means having an input and an output, said input being connected to an output of said feedback gain means, and (iii) sensor model means having an input and an output, said input of said sensor model means being connected to said output of said dynamic model means and said output of said sensor model means comprising said input to said comparison means; and detection logic means connected to an output of said comparison means for producing an output for an output means.

9. A system for detecting icing conditions in a fixed-wing aircraft, said system comprising:

aircraft performance sensors for detecting the performance of the aircraft and creating at least one aircraft performance detector output;

comparison circuitry for comparing said aircraft performance detector output with an input representative of expected aircraft performance data;

feedback circuitry for affecting said expected aircraft performance data, wherein said feedback circuitry includes (i) a feedback gain controller connected to an output of said comparison circuitry, (ii) a dynamic model generator having an input connected to an output of said feedback gain controller, and (iii) a sensor model for providing said expected aircraft performance data, said sensor model having an input connected to an output of said dynamic model generator and an output comprising said input to said comparison circuitry; and detection logic connected to an output of said comparison circuitry for producing an output to said aircraft.

10. The system as in claim 9, further including an icing detector for directly detecting the presence of ice on said aircraft, wherein an output of said icing detector is connected to another input to said comparison circuitry.

11. The system as in claim 9, further including aircraft anti-icing equipment controlled by said output to said aircraft.

12. The system as in claim 9, further including cockpit display equipment for indicating the presence or absence of icing conditions, said display equipment being controlled by said output to said aircraft.

* * * * *